United States Patent

Renard et al.

[11] Patent Number: 6,081,691
[45] Date of Patent: Jun. 27, 2000

[54] RECEIVER FOR DETERMINING A POSITION ON THE BASIS OF SATELLITE NETWORKS

[75] Inventors: Alain Renard, Chabreuil; Patrice Guillard, Valence, both of France

[73] Assignee: Sextant Avionique, Velizy, France

[21] Appl. No.: 09/051,091

[22] PCT Filed: Oct. 15, 1996

[86] PCT No.: PCT/FR96/01608

§ 371 Date: Apr. 14, 1998

§ 102(e) Date: Apr. 14, 1998

[87] PCT Pub. No.: WO97/14977

PCT Pub. Date: Apr. 24, 1997

[30] Foreign Application Priority Data

Oct. 17, 1995 [FR] France .................................. 95 12146

[51] Int. Cl.[7] .............................. H04B 7/185; H04B 1/38
[52] U.S. Cl. ........................ 455/12.1; 455/553; 455/552; 701/214
[58] Field of Search ................................. 455/12.1, 13.3, 455/427–430, 426, 553, 552, 98, 456, 131, 168.1; 701/213–215; 342/352, 357; 375/316, 302, 150

[56] References Cited

U.S. PATENT DOCUMENTS

| 5,535,432 | 7/1996 | Dent ................................... 455/12.1 X |
| 5,812,539 | 9/1998 | Dent ......................................... 370/321 |
| 5,822,376 | 3/1999 | Renard .................................... 375/316 |
| 5,850,420 | 12/1998 | Guillard et al. ......................... 375/316 |
| 5,884,214 | 3/1999 | Krasner ............................... 701/214 X |

*Primary Examiner*—Dwayne D. Bost
*Assistant Examiner*—Tracy M. Legree
*Attorney, Agent, or Firm*—Oblon, Spivak, McClelland, Maier & Neustadt, P.C.

[57] ABSTRACT

A receiver for determining position based on GPS satellites and GLONASS satellites. The receiver architecture includes a radio reception chain with an antenna, frequency conversion circuits, an analogue/digital converter operating at very high rate for the GLONASS pathway, and a signal processing circuit with several general-use channels capable of receiving both GPS signals and GLONASS signals. This circuit uses a programmable pseudo-random code generator and a phase servocontrol loop which uses a local oscillator to produce a local transposed carrier frequency; this oscillator is controlled in such a way as to be able to impose a start frequency for the acquisition of a satellite signal.

20 Claims, 3 Drawing Sheets

RECEIVER FOR DETERMINING A POSITION ON THE BASIS OF SATELLITE NETWORKS

BACKGROUND OF THE INVENTION

1. Field of the Invention

The invention relates to systems for determining the position of a point with respect to the earth, based on receiving radio-relay signals transmitted by a constellation of satellites orbiting the earth.

2. Discussion of the Background

There are currently two global positioning systems for carrying out this position determination almost anywhere on the earth; these being respectively the GPS system ("Global Positionning System") and the GLONASS system ("Global Orbiting Navigation Satellite System").

Both use a network of satellites circling the earth, each satellite regularly transmitting coded radio signals which a receiver can receive in order to compute its exact position in terms of longitude, latitude and altitude, and in addition its velocity and the exact time. A complementary system termed RGIC ("Random Geostationary Integrity Channel") is also being put in place; it uses geostationary satellites which transmit signals towards regions of the globe over which they are located.

The GPS system transmits spread-spectrum radio signals on a carrier frequency L1 equal to 1575.42 MHz, as well as signals on an auxiliary carrier frequency L2 of 1227.6 MHz. Here, only the frequency L1 will be of interest, but the principles set out below can be carried over, should the need be felt, to the frequency L2.

The signal spectrum is spread by pseudo-random codes, that is to say the signal on the carrier frequency L1 is modulated by a repetitive pseudo-random binary sequence also referred to as a PRN code (standing for "Pseudo-Random Noise"); in practice, the system uses two categories of PRN codes, namely;

- the C/A codes ("Coarse Acquisition") transmitted at a bit frequency of 1.023 MHz; they are 1023 bits long and the duration of a complete sequence is 1 millisecond; the C/A codes allow approximate position determination,
- and the P codes (standing for "Precise") transmitted at a frequency of 10.23 MHz and allowing a more accurate fix.

The logic transitions of the code are synchronized with the phase of the carrier L1, and the modulation is a phase modulation of a well defined type (BPSK).

The C/A codes are accessible to the public and must be generated locally within the receivers for three reasons: firstly, they make it possible to detect and demodulate the signals received, these signals being embedded in a very high level of noise (20 to 30 dB above the signal); detection is carried out by correlation between the code received from the satellite and an identical code produced locally; additionally, they make it possible to identify the transmitting satellite (in the GPS system a particular C/A code is assigned to each satellite); and lastly, they make it possible to measure time lags which are the indispensable basis for accurate computation of position.

The P codes are not accessible to the public; they are reserved for essentially military uses, and may moreover be encrypted on transmission.

The signals transmitted on the carrier frequency L1 are moreover coded using slow rate (50 baud) binary data which represent satellite navigation information, that is to say data serving in the position computations performed in the receiver. These navigation data are ephemerides which make it possible on the one hand to compute the exact position (accurate to within a meter) occupied by a satellite at any instant, and on the other hand to furnish all the receivers using the system with a common time reference. Here again, the modulation of the carrier L1 by the data is a phase modulation.

The distance between a satellite and the receiver is determined by measuring the duration of propagation, at the speed of light, of the radio signal between a satellite and the earth. It is therefore determined in particular by measuring the time discrepancy between the instant of transmission, by the satellite, of a characteristic bit (the "epoch" bit) of the pseudo-random code and the instant of reception by the receiver, of this characteristic bit.

The distances from the receiver to three different satellites make it possible to determine the position of the receiver in a fixed terrestrial frame once the receiver knows the position of the satellites in this frame at the instant of measurement. A fourth satellite makes it possible to eliminate the discrepancy between the clock of the receiver and the clock of the GPS system: the position of the satellites at each instant is defined by reference to a general system clock and the navigation data transmitted enable the receiver to ascertain this time reference. The measurement is made in two or three iterations on account of the fact that at the start, not possessing the exact time reference, it is only possible to lock on to the clock transmitted by the satellites to within 10 or 20 ms approximately, due to the signal propagation time from the satellites to the earth.

The relative speed of the receiver with respect to the satellites can also be determined by measuring the Doppler effect on the carrier frequency L1 received. The velocity of the receiver in the fixed frame of the terrestrial geoid is deduced from this.

The RGIC system is very similar to the GPS system. The GPS system uses circling satellites; the RGIC system uses geostationary satellites; it supplements the GPS system in order to cater for the latter's inadequacies or the risks of it breaking down. The signal types are still the same and the carrier frequency L1 is the same. Pseudo-random codes of the same length and frequency are used to identify the satellites; they differ from the codes of GPS satellites. The frequency of the navigation data is 250 baud instead of 50 baud. The data are coded by a Viterbi algorithm which carries out compression of the information.

The GLONASS system operates on similar general principles but significant differences may be noted:

- The terrestrial frame chosen is not the same: the centre of the earth is not exactly identical to that chosen for GPS. The direction of North is not entirely the same. Hence, if a GLONASS position is required from a GPS receiver, a transposition based on a conversion table or conversion software is necessary.
- In the GLONASS system the navigation data are transmitted at 100 baud rather than 50 and the frequency of the pseudo-random code is 511 kHz.
- Moreover, the carrier frequency L1 is not unique. Each satellite transmits on a particular frequency L1 and it is this frequency which allows it to be identified. The pseudo-random code is the same for all the satellites. It does not serve in identifying the satellite but merely in extracting the signal from the noise (spectral unspreading) and in determining the time discrepancies for accurate measurement of distance between the receiver and the satellite. The band of frequencies L1 used by the complete GLONASS system is fairly far removed from that of the GPS system; it goes from around 1600 MHz to around 1615 MHz. The frequencies L2 are likewise multiple.

Under these conditions, it is appreciated that a receiver designed to receive GPS signals is not suitable for computing a position from radio signals sent by GLONASS satellites, and vice versa.

There is however a considerable need to be able to use either system and the complementary systems such as RGIC also. This is because if certain satellites of one system are not correctly maintained, or if political reasons make them temporarily unusable, the consequences may be very serious for the users who will have established their operating procedures on the basis of one or other system. This is all the more important nowadays since the security of numerous systems is beginning to be based precisely on position detection by satellite. Such is the case in particular for maritime navigation and aerial navigation which are relying more and more on the GPS and GLONASS systems. For example, there are currently moves towards systematizing the landing-aid methods based on using signals from existing satellite networks.

It is of course always possible to employ two special-purpose receivers and to use one when the other cannot be used. This doubles the cost to the user. Or again, mixed receivers can be built which comprise a dual reception system. However, such a receiver is expensive since the number of GPS channels required is equal to the number of GPS satellites which it is desired to receive at the same time (at least four), and the number of GLONASS channels required is equal to the number of GLONASS satellites which it is desired to receive at the same time (at least four).

There is therefore a need for a cheap receiver which could receive GPS or GLONASS or RGIC signals or even other future systems, and which would not consist of a simple (expensive) juxtaposition of two different types of receivers.

SUMMARY OF THE INVENTION

Accordingly, the invention proposes a novel satellite signal receiver architecture which makes it possible to obtain at reasonable cost a receiver which can be used both with a system with a single carrier frequency L1 (such as GPS) and with a system with several carrier frequencies L1 (such as GLONASS). With this architecture it is in particular possible to use, for the digital signal processing (a complex and hence expensive part of the receiver), general-use channels which can receive the signals from either system.

According to the invention there is proposed a receiver of satellite signals, able to receive and process signals transmitted by satellites belonging to a network with a single carrier frequency and signals transmitted by satellites belonging to a network with several carrier frequencies, this receiver comprising:

a radio signals reception chain (10, 12, 14, 16, 18, 34, 38) comprising circuits for transposing the carrier frequencies received to several transposed frequencies differing according to the carrier frequency received, and at least one analogue/digital converter (38) for converting the signals thus transposed into a digital signal with several transposed carrier frequencies corresponding to several satellites received simultaneously and transmitting on different carriers, at least one digital signal processing channel which receives the digital signal with several transposed carrier frequencies, each channel comprising a random code phase- and transposed carrier phase- servocontrol loop, the servocontrol loop comprising on the one hand at least one digital phase control oscillator (108) controlled by a frequency set-point signal and a phase error signal and on the other hand a programmable local pseudo-random code generator (114), code selection means enabling a user to apply to the code generator a signal for selecting one code from several possible codes, the various codes corresponding to the various satellites of the two networks, frequency selection means, enabling the user to apply to the oscillator one from several possible frequency set-point signals, the various set-point signals corresponding to the various satellites of the second network as well as to all of the satellites of the first network;

the receiver finally comprising means (50, 80) for computing position from digital values provided in the servocontrol loop.

It will be noted that in the architecture proposed here, there are not as many different frequency transpositions as different carrier frequencies. However, for practical reasons provision is made for the radiofrequency reception chain to possess separate transposition and filtering pathways for the signals of the single-frequency system and for the signals of the multifrequency system. Preferably, there are also separate analogue/digital converters. However, the various digital signal processing channels are general-use and comprise a single processing pathway.

The local digital phase control oscillator preferably works at a computation frequency which is greater than twice the highest transposed frequency forwarded by the radiofrequency reception chain.

To provide a clear understanding of this original architecture, a few general principles upon which it relies are indicated briefly below.

The basic assumption is that the receiver must be suitable simultaneously for a single-frequency system L1 and a multifrequency system L1.

A. The radio signal, received by an antenna, undergoes at least one carrier frequency transposition and at least one broadband filtering making it possible to accept equally all the various carrier frequencies of the multifrequency system. There may be a transposition in several steps with successive intermediate frequencies. For the single-frequency system, the transposition can take the modulation signal to the baseband rather than to an intermediate frequency. In the case of the multifrequency system, the transposition ends up at an intermediate frequency which depends on the carrier frequency received and the broadband filtering lets through all the possible intermediate frequencies corresponding to the various carrier frequencies.

B. The transposed signal is converted into digital with the aid of an analogue/digital converter whose working frequency is in principle markedly greater than twice the maximum intermediate frequency received after transposition and filtering.

C. The signals transposed in frequency and then digitally converted are applied in principle in parallel to several signal processing channels (as many channels as satellites which it is desired to receive simultaneously). Each of the channels is capable of processing signals of the single-frequency system or signals of the multifrequency system. The channels are identical and are programmable. Programming consists in providing each channel with an indication, in the form of a digital command, of the identification of the network and satellite which it is desired to use.

D. Each channel comprises a pseudo-random code phase- and carrier phase- digital servocontrol loop for servocontrolling, in terms of phase and frequency, a random code generated locally and an identical random code received from a satellite, by taking the Doppler effect into account. The loop therefore receives the signal from the satellite after frequency transposition and analogue/digital conversion; it produces carrier phase error signals and code phase error signals which are used to sustain this code phase and carrier phase servocontrol.

E. The servocontrol loop uses, for the code phase servocontrol, a programmable local pseudo-random code generator (that is to say one which can transmit different codes which are chosen as a function of the satellite which it is wished to receive signals from; GLONASS code or a chosen RGIC or GPS code); this generator is gated by a clock whose operation is controlled in terms of phase and frequency by the code phase error signal generated by the loop.

F. The servocontrol loop also uses, for the carrier phase servocontrol, a local digital phase control oscillator which can receive on the one hand an initial set-point and on the other hand the carrier phase error signal; the initial value is programmable and corresponds to servocontrol on one satellite frequency value chosen from among several values (the GPS frequency or a selected GLONASS frequency). The working frequency of this local oscillator (that is to say the frequency of computing the digitally synthesized phase samples, and not the frequency of the oscillation produced) is high enough to make it possible to synthesize any desired frequency belonging to the band of frequencies which can be converted by the analogue/digital converter.

These principles being set out, it will be appreciated that the invention also proposes a process for receiving satellite signals in a receiver and determining a receiver position from the signals received, the satellites belonging either to a first network with a single carrier frequency or to a second network with several carrier frequencies, characterized in that it comprises the following operations:

receiving the signals from several satellites on an antenna, transposing the carrier frequency of the various signals received, thereby producing several transposed carrier frequencies differing according to the carrier received, applying several simultaneously received carrier frequencies to at least one common analogue/digital converter and converting the corresponding composite signal into a digital signal;

applying the digital signals from the converter to at least one signal processing channel common to all the transposed carrier frequencies received from the converter;

selecting a set-point frequency corresponding to a particular transposed frequency, from among several possible set-points corresponding to different satellites, and applying a corresponding set-point signal to a digital phase control oscillator so as to make this oscillator produce the set-point frequency, the oscillator moreover receiving a phase error signal derived by a phase servocontrol loop in which it is located;

selecting a pseudo-random code and applying a corresponding set-point signal to a programmable pseudo-random local code generator so as to make the generator produce one desired code from several possible codes, the code generator being located in the servocontrol loop and correlation means being provided in order to shift the code produced so as to place it in synchronism with the identical code present in the modulation of the signal received from the converter;

computing a receiver position from digital values provided in the servocontrol loop.

BRIEF DESCRIPTION OF THE DRAWINGS

Other characteristics and advantages of the invention will emerge on reading the detailed description with follows and which is given with reference to the appended drawings, in which.

DESCRIPTION OF THE PREFERRED EMBODIMENTS

Figure 1:
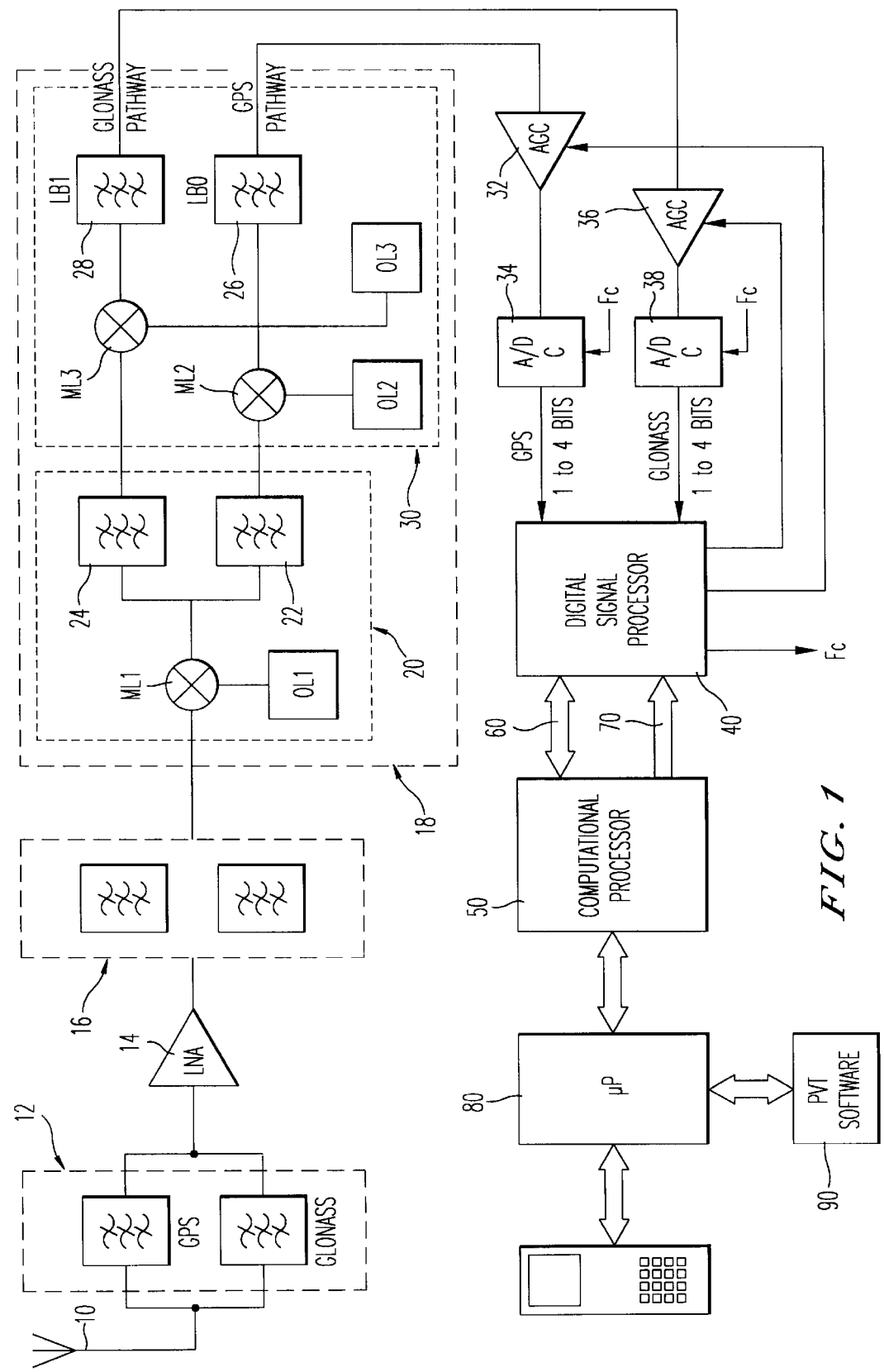
FIG. 1 represents the overall structure of a satellite signal receiver according to the invention.

The invention will be described in detail with regard to a receiver which can receive both the signals from the GPS satellite network (network with a single carrier frequency L1) and the signals from the GLONASS satellite network (network with several carrier frequencies L1).

The overall structure of the receiver according to the invention comprises a radio antenna 10 followed by a filter 12 which lets through all the desired carrier frequencies L1. This filter is preferably a dual-band filter, a very narrow band (a few MHz) for the GPS frequency of 1575.42 MHz and a wider band of around 1597 to 1617 MHz for the entirety of possible GLONASS frequencies.

This filter is followed by a low-noise radio-frequency amplifier 14 and by a new filter 16 of the same type as the first. The radio frequency signals thus amplified and filtered are applied to a set of frequency transposition circuits 18 to produce signals at smaller intermediate frequencies than the carriers L1 but which retain the phase modulation of these carriers; the frequency transposition ends up at frequencies which can be processed by the subsequent signal processing circuits. The order of magnitude of the maximum working frequencies of the fast silicon signal processing circuits is around 60 MHz. Intermediate frequencies which are much smaller than this value are therefore chosen.

Although this is not essential, the frequency transposition is generally carried out in several cascaded stages, with various lower and lower intermediate frequencies. In the example represented in FIG. 1 by way of illustration, there is a first stage 20 for transposition to a first intermediate frequency, followed by a second stage 30 for transposition to lower intermediate frequencies. The first stage 20 uses a local oscillator OL1, a mixer ML1 and filters 22, 24. It transposes the signals received, GPS or GLONASS, into as many intermediate-frequency signals as there are carriers L1 in the signal received: there is one first intermediate frequency which results from transposing the GPS carrier frequency at 1575.42 MHz, and there are additionally as many intermediate frequencies as there are carrier frequencies for GLONASS since the same local oscillator OL1 is used irrespective of the GLONASS frequency received. The mixed signals pass in parallel through two separate filters: filter 22 with narrow band centred on the intermediate frequency resulting from transposing the GPS carrier, this filter allowing through only the GPS signals; and filter 24 with a much wider band, capable of allowing through all the intermediate frequencies resulting from transposing the GLONASS carriers.

The second transposition stage 30 operates in the same way but on separate pathways for GPS and GLONASS.

The output from the filter 22 (GPS pathway) is applied to a mixer ML2 which additionally receives the frequency transmitted by a local oscillator OL2; the output from the mixer ML2 is filtered by a filter 26 centred on the new intermediate frequency resulting from the transposition, a frequency which will be referred to below as the transposed carrier frequency FtO. For this GPS pathway, the transposed carrier frequency FtO may moreover be zero (to within the Doppler effect): the output signal is then a baseband modulation which incorporates a Doppler effect. The bandwidth LB0 of the filter 26 must make it possible to allow through the modulation spectrum of the GPS signal and of course the Doppler frequency also.

The other frequency transposition pathway, the GLONASS pathway, comprises a mixer ML3, an oscillator OL3 and a filter 28. The transposition creates a series of transposed carrier frequencies Ft1 to Ftn: one for each GLONASS carrier L1. The passband LB1 of the filter 28 of the GLONASS pathway is much wider than that of the GPS filter 26. It goes from the lowest transposed frequency (Ft1) to the highest transposed frequency (Ftn). Additionally, it must of course also take into account the modulation spectrum and the Doppler effect on these two extreme frequencies; the bandwidth LB1 is therefore at least 15 or 20 MHz.

The local oscillators OL1, OL2, OL3 have been represented in FIG. 1 as independent elements. In reality, a single frequency synthesizer locked on to a reference oscillator delivers three outputs OL1, OL2, OL3 at mutually interlocked frequencies.

The receiver next comprises, for the GPS pathway, a gain-control amplifier 32 followed by an analogue/digital converter 34 and, for the GLONASS pathway, a gain-control amplifier 36 followed by an analogue/digital converter 38. The gain control is used if the converters code the analogue signal on several bits, but coding on one bit with no gain control is also possible in certain cases. The gain control information originates from statistical computations performed on series of samples of the digitized signal.

The converters work at a sampling frequency Fc which is comfortably greater than twice the highest transposed frequency likely to be received and transmitted to the converters. For the GLONASS pathway, the highest frequency is Ftn which may be of the order of 20 MHz. In practice, a conversion frequency of greater than 50 MHz, for example equal to 60 MHz, is then necessary. For convenience, the same type of converter and the same working frequency Fc will be adopted for the GPS pathway since the signals produced are subsequently processed by the same circuits irrespective of their origin.

The converters produce digital signals which are successive samples, delivered at the rate Fc, of an analogue signal which comprises one or more transposed carrier frequencies (Ft0 for the converter 34, Ft1 to Ftn for the converter 38), modified by the Doppler effect and phase-modulated by the pseudo-random codes and the navigation data of each of the satellites which are visible from the receiver.

These information-carrying digital signals are applied to a digital signal processing circuit 40 controlled by a computational processor 50 communicating with the circuit 40 by way of an information bus 60 and a control bus 70. The computational processor itself communicates with a microprocessor 80 which performs the position computations on the basis of the information gleaned from the signal processing circuit 40 and the computational processor 50. The microprocessor 80 operates using software 90 which may be referred to as "PVT software" since this is what computes the PVT ("Point, Velocity, Time) position from digital information delivered by the computational processor. The microprocessor 80 is controlled by the user of the receiver, which can communicate with him via multi-purpose peripherals (screen, keyboard, printer etc.) or via control buttons and special-purpose display systems. The computational processor 50 and the microprocessor 80 can be brought together into a single microprocessor.

Hence, it may be seen in FIG. 1 that there are two distinct pathways for extracting the information received, depending on whether it is desired to use the GPS network or the GLONASS network. However, it should be appreciated that this solution with separate pathways results solely from the fact that the 1575.42 MHz GPS frequency is fairly far removed from the maximum GLONASS frequency (around 1617 MHz). The discrepancy is more than 40 MHz. If in the future analogue/digital converters operating at 100 MHz or more are constructed (fast semiconductor technologies using GaAs, Germanium, superconductors, etc.), the GPS pathway loses its usefulness and the GLONASS pathway alone may be retained in the circuit of FIG. 1 in order to pass the GLONASS signals and the GPS signals. The principle is that a single pathway is sufficient if the single carrier frequency L1 of the first network is close enough to the carrier frequencies L1 of the second network.

Figure 2:
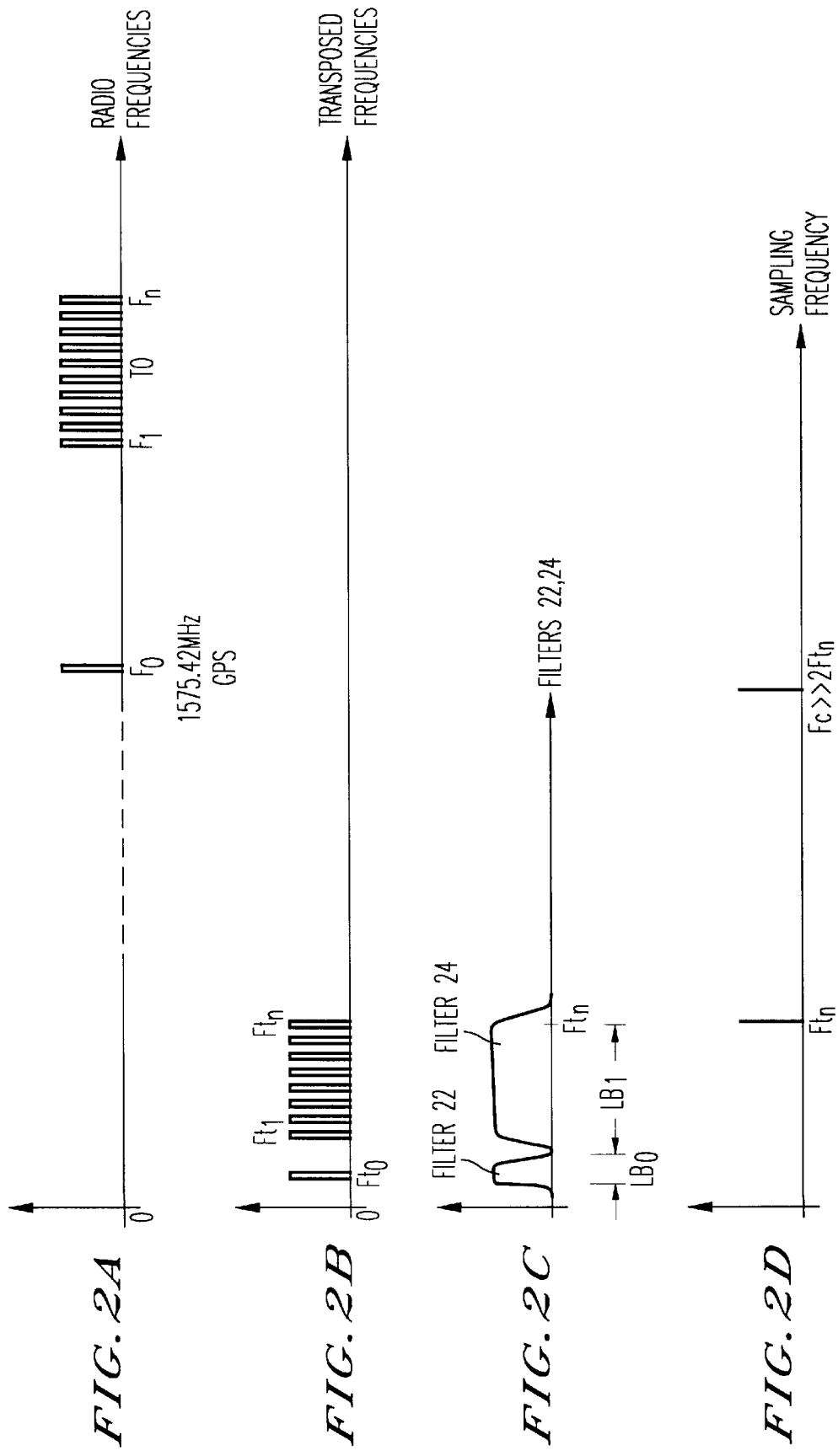
FIG. 2 represents diagrams of frequency bands processed in the reception chain of FIG. 1.

FIG. 2 represents diagrammatically the apportioning of the GPS (F0) and GLONASS (F1 to Fn) carrier frequencies, the corresponding apportioning of the GPS (Ft0, possibly zero or equal to the Doppler frequency due to the relative motion of the receiver and satellite) and GLONASS (Ft1 to Ftn) transposed frequencies, the bandwidth LB0 of the filter 22, and the bandwidth LB1 of the filter 24. The working frequency Fc of the converter 38 is comfortably greater than 2×Ftn, for example 60 MHz if Ftn is about 20 MHz.

Figure 3:
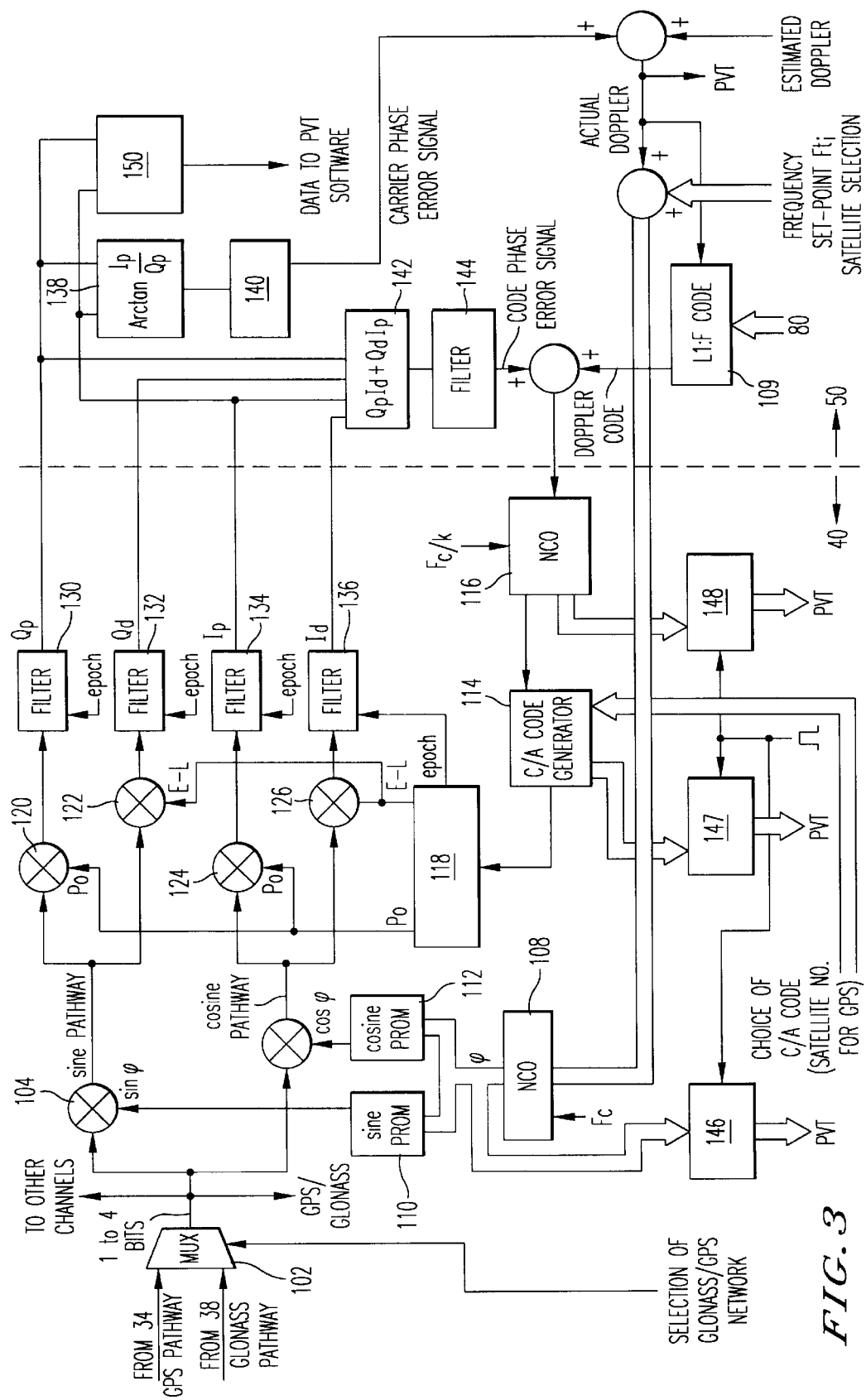
FIG. 3 represents the architecture of the digital signal processing circuits located downstream of the radio frequency signal reception chain.

FIG. 3 represents the general architecture of the signal processing circuit 40 of the receiver according to the invention; a part of the circuits of the computational processor 50 is also represented. As may be seen, the signal processing circuit 40 does not contain separate pathways for processing the GPS signals and for processing the GLONASS signals. One single multiplexer 102, at the input of the circuit 40, receives on two inputs the digital signals from the converters 34 and 38 and makes it possible to choose, depending on a command from the user, whether it is desired to use the GPS network or the GLONASS network. The signals selected by the multiplexer 102 are processed by the circuit 40 which accepts either the signals from the GPS pathway or equally well the signals from the GLONASS pathway even though they correspond to different frequency bands.

Here the processing circuit 40 comprises several channels (in principle four or more); they are identical and a single channel only will be described in detail. The signals from the multiplexer are received by all the channels in parallel. Each channel is programmed to receive the signals from a specified satellite in direct line of sight of the receiver, but any channel can be programmed to receive the signals from any GPS or GLONASS (or RGIC) satellite.

A channel essentially comprises:

a generator of a local transposed carrier frequency in order to create a local signal at a frequency close to that of the transposed carrier frequencies which it is desired to use;

a code generator for creating a local pseudo-random code identical to a pseudo-random code which it is desired to detect;

a random code phase and carrier phase servocontrol loop, which loop produces a carrier phase error digital signal and a code phase error digital signal, and which is intended on the one hand to servocontrol the phase (and the frequency) of the local frequency generator to the phase (and frequency) of the signal received from the multiplexer 102, and on the other hand to servocontrol the phase of the local pseudo-random code to the phase of the random code possibly present in the signal delivered by the multiplexer. The error signals act on the local frequency generator and on the local code generator and are produced by computational software executed by the digital computational processor 50.

The various elements mentioned above and present in each channel of the signal processing circuit will now be described.

Although there is both carrier phase servocontrol and code phase servocontrol, it cannot be imagined that there are two separate servocontrol loops, since, as will be seen, in practice the two servocontrols are nested one within the other.

The GPS or GLONASS signals output by the multiplexer 102 are applied to two digital multipliers 104 and 106 which also receive a digital signal representing the sine (for one of the multipliers) and the cosine (for the other) of a periodic digital phase signal produced by a digital phase control oscillator 108. This digital phase control oscillator constitutes the local frequency generator mentioned above. The computational frequency of the oscillator 108, that is to say the frequency with which it delivers phase increments, is a high frequency which must be greater than twice the maximum transposed carrier frequency present at the input of the multiplexer. The computational frequency is preferably 60 MHz in practice. It is in principle the same as the sampling frequency Fc of the converters 34 and 38, but this is not essential.

The oscillator 108 possesses a digital control input via which may be imposed the value of the phase increments which it adds to each new computation. The operation of the oscillator consists in fact in repeating, at the frequency Fc, an operation of adding a previous output phase and an increment imposed by the control input, so as to produce a new output phase. Here, the control input imposes a phase increment which is the sum of a loop phase error signal (error signal computed inside the loop by the processor 50) and of a predetermined initial set-point value. The initial value is the one which enables the local generator to produce a nominal local frequency corresponding to a well-specified transposed carrier frequency. This transposed frequency corresponds to the actual nominal carrier frequency of a specified satellite (GPS or GLONASS) on to which it is required to lock. The initial value serves for the acquisition of a specified satellite signal and it is therefore imposed both by the choice of network, GPS or GLONASS, and, for GLONASS, by the choice of a specified satellite.

Hence, for a given channel, the user defines, by way of the microprocessor 80, the desired initial set-point frequency applied to the oscillator 108 as a function of the satellite sought in respect of this channel.

In a procedure for continuous iterative computation of the PVT point, the point computational software in principle delivers an estimated Doppler value (resulting from the previous PVT point computations), so that, in accordance with the diagrammatic representation of FIG. 3, the control signal for the digital oscillator 108 may be regarded as being the sum of an initial value defined by the user (who selects either a specified GLONASS satellite number or all of the GPS satellites); this is the frequency set-point;

of an estimated Doppler value delivered by the PVT software;

and of a carrier phase error signal which closes the servocontrol loop.

The sum of the estimated Doppler value and of the carrier phase error signal represents the actual Doppler value. The digital signal representing this value is sent to the PVT software 90 and is used, moreover, after digital division in the ratio carrier frequency L1 to code frequency (a ratio depending therefore on the GPS or GLONASS channel chosen), as Doppler shift signal in the code servocontrol loop. A programmable digital divider 109, controlled by the microprocessor 80, has been represented for this purpose in FIG. 3.

The oscillator 108 therefore delivers a signal with a desired transposed frequency and it is servocontrolled by the phase error signal so as to lock exactly, in terms of phase and frequency, onto a signal arriving from the sought-after satellite, this signal having been transmitted on a carrier L1 corresponding to this transposed frequency but which may be affected by a Doppler shift.

Here, the servocontrol is carried out by digital computation and uses the sine and cosine functions of the phase delivered by the oscillator 108.

The sine and cosine functions can be obtained from a digital table. A PROM sine memory 110 and a PROM cosine memory 112 are interposed for this purpose between the output of the oscillator 108 and the multipliers 104 and 106.

The outputs from the multipliers therefore represent two phase quadrature signals whose spectra comprise a low-frequency component which represents the shift between the transpose of the satellite frequency received and the frequency produced locally. This shift component is used to produce the abovementioned carrier phase error signal which tends to reduce the shift to zero.

The output signals from the multipliers 104 and 106 then undergo correlation in the abovementioned servocontrol loop so as to detect the existence, in the signal received, of a pseudo-random code corresponding to a sought-after satellite. These signals, which inherently transport a modulation by the known pseudo-random code transmitted by the satellite on which it is desired to base a measurement, are therefore correlated with an identical pseudo-random code produced locally by a pseudo-random code generator 114. The correlation produces a correlation signal which is used to shift the start instant of the local code (the instant tagged by the "epoch" bit) until the correlation signal indicates that the local code and the code received are perfectly synchronous. The correlation signal exhibits a correlation spike, or a correlation zero (depending on the type of correlator) indicating this synchronization. It then merely remains to measure the start instant of the local code in order to determine the position of the satellite by subsequent computation. This start instant is determined by examining the state of the pseudo-random code at a given instant and by examining the phase of an oscillator which drives the code generator 114. The microprocessor 80 defines this instant and gathers this information which is utilized by the PVT software 90.

Since the code correlation loop is nested within the carrier phase servocontrol loop, the Doppler effect which is present in the signal received, and hence present in the frequency of transitions of the pseudo-random code received, has no effect on the correlation: the local code is produced with a frequency of transitions which is servocontrolled to the frequency of the carrier actually received, this offsetting any synchronization error due to the Doppler effect. The programmable divider 109 participates in this Doppler frequency correction by adding a correction to the code phase error signal which is produced by digital computation in the servocontrol loop.

The local code generator 114 receives a clock signal (to define the code transitions) from a digital phase control oscillator 116. This oscillator receives on a control input the code phase error signal with the Doppler correction; it therefore receives a signal which represents the discrepancy in synchronization between the local code and the code received; this signal results from the correlation between these two codes; it tends to reduce the phase and frequency of the local pseudo-random code to the phase and frequency value of the identical code present in the signal received from the sought-after satellite. The sampling frequency of this oscillator (frequency of computing the phase samples by successive incrementations) is preferably a sub-multiple Fc/k of the sampling frequency Fc.

The oscillator 116 provides at every instant a phase value which can be read (for computation of the PVT point) but it is the carry output (or "ripple carry") from the oscillator which is applied to the code generator 114 to define the instants of transition of the local code.

The pseudo-random code generator is programmable, that is to say it can produce any pseudo-random sequence from the series of sequences defined in the GPS system and in the GLONASS system, and possibly others also. To this end it possesses a code selection input which receives an instruction representing one from N possible sequence numbers. This instruction is provided by the user and hence by the control microprocessor 80.

The correlation is performed by multiplying the local code by the digitized signal resulting from multiplying the local carrier frequency by the sine and cosine. The sine and cosine pathways thus comprise, like the starting digitized signal, the pseudo-random modulation transmitted by the satellite, and correlation is possible on these pathways.

The local pseudo-random code produced by the generator 114 could be used directly for correlation with the signals received from the satellite. However, it is generally preferred to perform a more accurate correlation using both the code itself and the slightly early and/or late code. Typically, it is possible to use:

a code P0 termed the punctual code (synchronous with the code found in the signal received from the satellite), an early code E, a fraction of a moment early (a moment, or "chip", corresponds to the minimum reference time separating two elementary transitions of the code), and a late code L, a fraction of a moment late.

A simple process consists in performing a correlation with the P punctual code and the difference between the E and L codes. Represented in FIG. 3 is a combinational circuit 118 at the output of the code generator 114 for creating the punctual codes P and the difference code E–L from the generator output code.

The correlation is performed in digital multipliers and digital filters which are inserted into the phase quadrature (sine and cosine) pathways of the servocontrol loop, that is to say at the output of the multipliers 104 and 106. The sine pathway and the cosine pathway are each multiplied on the one hand by the punctual code P0 and on the other hand by the difference code E–L using digital multipliers 120, 122, 124, 126, which make it possible at any moment to multiply a digital value (coded on 13 bits for example) by a bit of the local pseudo-random code.

The outputs from the multipliers 120 to 126 pass through the digital filters 130 to 136 which are integrators of the "integrate and dump" type, whose function is to integrate the results from the multiplications for a duration of 1 millisecond corresponding to a complete duration of a pseudo-random sequence, and to revert to zero periodically at the end of each sequence. The integration is an accumulation in a counter which is incremented, decremented or remains unchanged depending on the sign and amplitude of the digital signal which it receives from the multiplier which precedes it. The return to zero is controlled by the epoch bit of the punctual sequence. These integrators deliver low-frequency signals (1 kHz) for example on 8 bits each Ip, Qp, Id, Qp, which are the basis of the correlation function. These signals thus represent a correlation indication regarding the sine and cosine pathway, through a punctual code P0 and through a difference code E–L. They are delivered to the computational processor 50 which uses them to calculate a code phase error signal intended for the oscillator 116, thus closing the code phase servocontrol loop. They also serve in calculating the carrier phase error signal intended for the oscillator 108, thus closing the carrier phase servocontrol loop.

It will be noted that the operation of the filters 130 to 136 is driven partially by software and that this operation can be modified depending on whether one is working in GPS or GLONASS mode, so as to take into account small differences such as the difference in code frequency.

The carrier phase error signal is produced in a discriminator 138 from a calculation of the type Arctan (Qp/Ip) followed by a digital filter 140. The calculation of the carrier phase error signal does not involve the correlation through the difference code E–L.

The code phase error signal is produced in a discriminator 142 from a calculation involving for example the sum of products Qd.Ip+Qp.Id, followed by a very low frequency digital filter 144. The calculation involves the correlation through the punctual code and the correlation through the difference code.

The code phase error signal, and also the carrier phase error signal, comprise information which can be transmitted to the computational processor 50 and possibly to the microprocessor 80 to enable the position (PVT) of the receiver to be computed. For example, they inherently include a Doppler shift information item, from which may be extracted the relative velocity of the receiver with respect to the satellite.

In practice, the software for computing the PVT point sends a read pulse simultaneously to all the channels in order to read, at this instant, the phase state of the carrier, the phase state of the code and the value of the code. These three items of information, gathered in the servocontrol loop of each channel, make it possible to compute the distance from the receiver to each of the various satellites observed.

Represented in FIG. 3 are registers 146, 147, 148 which respectively receive, at the time of the read pulse, the phase of the oscillator 108; representing the phase of the carrier at this instant;

the state of the pseudo-random code at this instant, defined for example by 10 significant bits present on the parallel outputs of the code generator 114;

and the exact phase of the code, to within a fraction of a moment, defined by the precise phase of the oscillator 116.

The navigation data, sent by the satellites using DPSK modulation at low frequency (50 or 100 Hz), are conventionally decoded in a circuit 150 of the computational processor 50; this circuit detects the phase changes due to the navigational data, which are moreover synchronized on transmission with the epoch bit of the pseudo-random sequences. The navigational data are sent to the software 90 for computing the PVT point. The data detected are furthermore taken into account by the computational processor 50 and the circuit 40 so that the data-related transitions do not disturb the servocontrol loop.

There is thus described the basis of the architecture of the receiver according to the invention, which makes it possible to use only a limited number of channels to receive any of several types of satellite networks. It will be appreciated that what has been stated with regard to signal detettion on the carriers L1 is applicable also to the carriers L2. General-use digital processing channels identical to those for the carriers L1 can be used for the GPS and GLONASS frequencies L2; the carriers L2 will then be transposed into frequency bands which are compatible with the operation of these channels. Alternatively, the same channels can serve for L1 and L2, with an alternating frequency transposition for L1 and L2 and time-division multiplexing of the signals on L1 and on L2.

What is claimed is:

1. Receiver of satellite signals, able to receive and process signals transmitted by satellites belonging to a network with a single carrier frequency and signals transmitted by satellites belonging to a network with several carrier frequencies, this receiver comprising:

a radio signals reception chain comprising circuits for transposing the carrier frequencies received to several transposed frequencies differing according to the carrier frequency received, and at least one analogue/digital converter for converting the signals thus transposed into a digital signal with several transposed carrier frequencies corresponding to several satellites received simultaneously and transmitting on different carriers, at least one digital signal processing channel which receives the digital signal with several transposed carrier frequencies, each channel comprising a random code phase- and transposed carrier phase- servocontrol loop, the servocontrol loop comprising on the one hand at least one digital phase control oscillator controlled by a frequency set-point signal and a phase error signal and on the other hand a programmable local pseudo-random code generator, code selection means enabling a user to apply to the code generator a signal for selecting one code from several possible codes, the various codes corresponding to the various satellites of the two networks, frequency selection means, enabling the user to apply to the oscillator one from several possible frequency set-point signals, the various set-point signals corresponding to the various satellites of the second network as well as to all of the satellites of the first network;

the receiver finally comprising means for computing position from digital values provided in the servocontrol loop.

2. Receiver according to claim 1, characterized in that the analogue/digital converter works at a sampling frequency which is greater than twice the highest transposed carrier frequency present in the signals which it can receive from the frequency transposition circuits.

3. Receiver according to claim 2, characterized in that it comprises a second analogue/digital converter for receiving signals with at least one other transposed frequency, and a multiplexer for transmitting the output of one or other of the converters to the signal processing channels.

4. Receiver according to claim 3, characterized in that the various frequency setpoint signals act on the oscillator so that the latter provides respective nominal frequencies equal to the transposed frequencies corresponding to the transposition of the various nominal carrier frequencies of the satellites of the two networks.

5. Receiver according to claim 3, characterized in that the servocontrol loop includes means for computing the sine and cosine of a periodic phase defined at the output of the digital phase control oscillator, and means for multiplying the sine and cosine thus produced by the digitized signal output by the reception chain, so as to produce two phase quadrature signals.

6. Receiver according to claim 3, characterized in that the pseudo-random code generator is controlled by a clock consisting of a digital phase control oscillator, the oscillator receiving a code phase error signal as digital input signal, the error signal indicating a discrepancy of synchronization between a code produced locally by the code generator and an identical code present in the signal received from a satellite.

7. Receiver according to claim 2, characterized in that the various frequency setpoint signals act on the oscillator so that the latter provides respective nominal frequencies equal to the transposed frequencies corresponding to the transposition of the various nominal carrier frequencies of the satellites of the two networks.

8. Receiver according to claim 2, characterized in that the servocontrol loop includes means for computing the sine and cosine of a periodic phase defined at the output of the digital phase control oscillator, and means for multiplying the sine and cosine thus produced by the digitized signal output by the reception chain, so as to produce two phase quadrature signals.

9. Receiver according to claim 2, characterized in that the pseudo-random code generator is controlled by a clock consisting of a digital phase control oscillator, the oscillator receiving a code phase error signal as digital input signal, the error signal indicating a discrepancy of synchronization between a code produced locally by the code generator and an identical code present in the signal received from a satellite.

10. Receiver according to claim 1, characterized in that the various frequency set-point signals act on the oscillator so that the latter provides respective nominal frequencies equal to the transposed frequencies corresponding to the transposition of the various nominal carrier frequencies of the satellites of the two networks.

11. Receiver according to claim 10, characterized in that the servocontrol loop includes means for computing the sine and cosine of a periodic phase defined at the output of the digital phase control oscillator, and means for multiplying the sine and cosine thus produced by the digitized signal output by the reception chain, so as to produce two phase quadrature signals.

12. Receiver according to claim 10, characterized in that the pseudo-random code generator is controlled by a clock consisting of a digital phase control oscillator, the oscillator receiving a code phase error signal as digital input signal, the error signal indicating a discrepancy of synchronization between a code produced locally by the code generator and an identical code present in the signal received from a satellite.

13. Receiver according to claim 1, characterized in that the digital phase control oscillator operates with a computation frequency which is greater than twice the highest transposed frequency.

14. Receiver according to claim 13, characterized in that the servocontrol loop includes means for computing the sine and cosine of a periodic phase defined at the output of the digital phase control oscillator, and means for multiplying the sine and cosine thus produced by the digitized signal output by the reception chain, so as to produce two phase quadrature signals.

15. Receiver according to claim 13, characterized in that the pseudo-random code generator is controlled by a clock consisting of a digital phase control oscillator, the oscillator receiving a code phase error signal as digital input signal, the error signal indicating a discrepancy of synchronization between a code produced locally by the code generator and an identical code present in the signal received from a satellite.

16. Receiver according to claim 1, characterized in that the servocontrol loop includes means for computing the sine and cosine of a periodic phase defined at the output of the digital phase control oscillator, and means for multiplying the sine and cosine thus produced by the digitized signal output by the reception chain, so as to produce two phase quadrature signals.

17. Receiver according to claim 16, characterized in that the pseudo-random code generator is able to provide a punctual local code, an early code and a late code, and in that means are provided for multiplying the phase quadrature signals by the punctual local pseudo-random code and by the difference between the early and late local pseudo-random codes.

18. Receiver according to claim 1, characterized in that the pseudo-random code generator is controlled by a clock consisting of a digital phase control oscillator, the oscillator receiving a code phase error signal as digital input signal, the error signal indicating a discrepancy of synchronization between a code produced locally by the code generator and an identical code present in the signal received from a satellite.

19. Receiver according to claim 1, characterized in that the frequency transposition circuits include a final stage with two separate pathways, one pathway receiving the signals from the network with a single frequency and one pathway receiving the signals from the network with several frequencies, this second pathway comprising a single common oscillator which transposes the various carrier frequencies into several different transposed carrier frequencies.

20. Process for receiving satellite signals in a receiver and determining a receiver position from the signals received, the satellites belonging either to a first network with a single carrier frequency or to a second network with several carrier frequencies, characterized in that it comprises the following operations:

receiving the signals from several satellites on an antenna, transposing the carrier frequency of the various signals received, thereby producing several transposed carrier frequencies differing according to the carrier received, applying several simultaneously received carrier frequencies to at least one common analogue/digital converter and converting the corresponding composite signal into a digital signal;

applying the digital signals from the converter to at least one signal processing channel common to all the transposed carrier frequencies received from the converter;

selecting a set-point frequency corresponding to a particular transposed frequency, from among several possible set-points corresponding to different satellites, and applying a corresponding set-point signal to a digital phase control oscillator so as to make this oscillator produce the set-point frequency, the oscillator moreover receiving a phase error signal derived by a phase servocontrol loop in which it is located;

selecting a pseudo-random code and applying a corresponding set-point signal to a programmable pseudo-random local code generator so as to make the generator produce one desired code from several possible codes, the code generator being located in the servocontrol loop and correlation means being provided in order to shift the code produced so as to place it in synchronism with the identical code present in the modulation of the signal received from the converter;

computing a receiver position from digital values provided in the servocontrol loop.

* * * * *

UNITED STATES PATENT AND TRADEMARK OFFICE
CERTIFICATE OF CORRECTION

PATENT NO. : 6,081,691

DATED : June 27, 2000

INVENTOR(S): Alain RENARD, et al.

It is certified that an error appears in the above-identified patent and that said Letters Patent is hereby corrected as shown below:

On the Title Page, Item [73] the Assignee should read as follows:

[73] Assignee: Sextant Avionique, Velizy Villacoublay, France

Signed and Sealed this

Tenth Day of April, 2001

*Attest:*

NICHOLAS P. GODICI

*Attesting Officer*      *Acting Director of the United States Patent and Trademark Office*